(12) United States Patent
Berney

(10) Patent No.: US 6,299,068 B1
(45) Date of Patent: Oct. 9, 2001

(54) OPTO-ELECTRONIC TAG HAVING AN INTERNAL TIME BASE

(75) Inventor: Jean Claude Berney, Les Charbonnières (CH)

(73) Assignee: Valtac, Alex Beaud, Geneva (CH)

(*) Notice: Subject to any disclaimer, the term of this patent is extended or adjusted under 35 U.S.C. 154(b) by 0 days.

(21) Appl. No.: 08/849,544

(22) PCT Filed: Dec. 1, 1995

(86) PCT No.: PCT/CH95/00283

§ 371 Date: Jul. 14, 2000

§ 102(e) Date: Jul. 14, 2000

(87) PCT Pub. No.: WO96/18970

PCT Pub. Date: Jun. 20, 1996

(30) Foreign Application Priority Data

Dec. 13, 1994 (CH) .................................................. 3759/94

(51) Int. Cl.⁷ .................................................. G06K 19/00
(52) U.S. Cl. .......................................... 235/487; 235/491
(58) Field of Search ................................... 235/487, 494, 235/492, 462.01, 454

(56) References Cited

U.S. PATENT DOCUMENTS 4,877,945    10/1989    Fujisaki .
5,354,979    10/1994    Adelson .

FOREIGN PATENT DOCUMENTS

| 0461878 A2 | 12/1991 | (EP) . |
| 2548803 B1 | 1/1985 | (FR) . |
| 2 548 803 * | 1/1985 | (FR) . |
| 2636188 A1 | 3/1990 | (FR) . |
| 2196203 A | 4/1988 | (GB) . |

* cited by examiner

Primary Examiner—Karl D. Frech
(74) Attorney, Agent, or Firm—Oppedahl & Larson LLP

(57) ABSTRACT

The invention relates to a read or read-write label of an optical nature comprising a nonvolatile memory with its control circuit, a control or checking circuit for the charge of a buffer capacitor and a sequence generator making it possible to supply to the outside optical signal sequences in harmony with the states of the different circuits and analyze the optical signals coming from the outside.

9 Claims, 4 Drawing Sheets

OPTO-ELECTRONIC TAG HAVING AN INTERNAL TIME BASE

It is possible with existing means to implement autonomous optoelectronic labels incorporating a nonvolatile memory and which can be supplied, read or read-written in remote manner. Labels of this type are described in French patent application FR 2,548,803 and U.S. Pat. No. 5,354,979. FR 2,548,803 defining the closest prior art is mentioned in the preamble of the independent claim. Swiss patent application 02 120/94-0 of Mar. 7, 1994 describes another label of this type more particularly concentrating on the optoelectronic means to be implemented in order to remotely supply said label, as well as for delivering and receiving informations by optical signals. It is obvious that, independently of the optoelectronic part, the procedures which control the communication between the label and the external read-write means have the greatest importance and condition the reliability of such a label.

The object of the present invention is to propose an optielectronic label having simple and effective means for controlling said communication. This optoelectronic label having at least one electronic memory able to maintain its state in the absence of a power supply, a control circuit for said memory, and a combination of electrooptical means arranged in such a way as to supply said label and transmit light signals to the outside, is characterized in that it has a time base controlling a sequence generator connected at least indirectly to subassemblies to subsystems constituting said label, said generator being arranged in such a way as to deliver light signals of characterized sequences making it possible to transmit to the outside informations concerning said subassemblies or subsystems.

Figure 1:
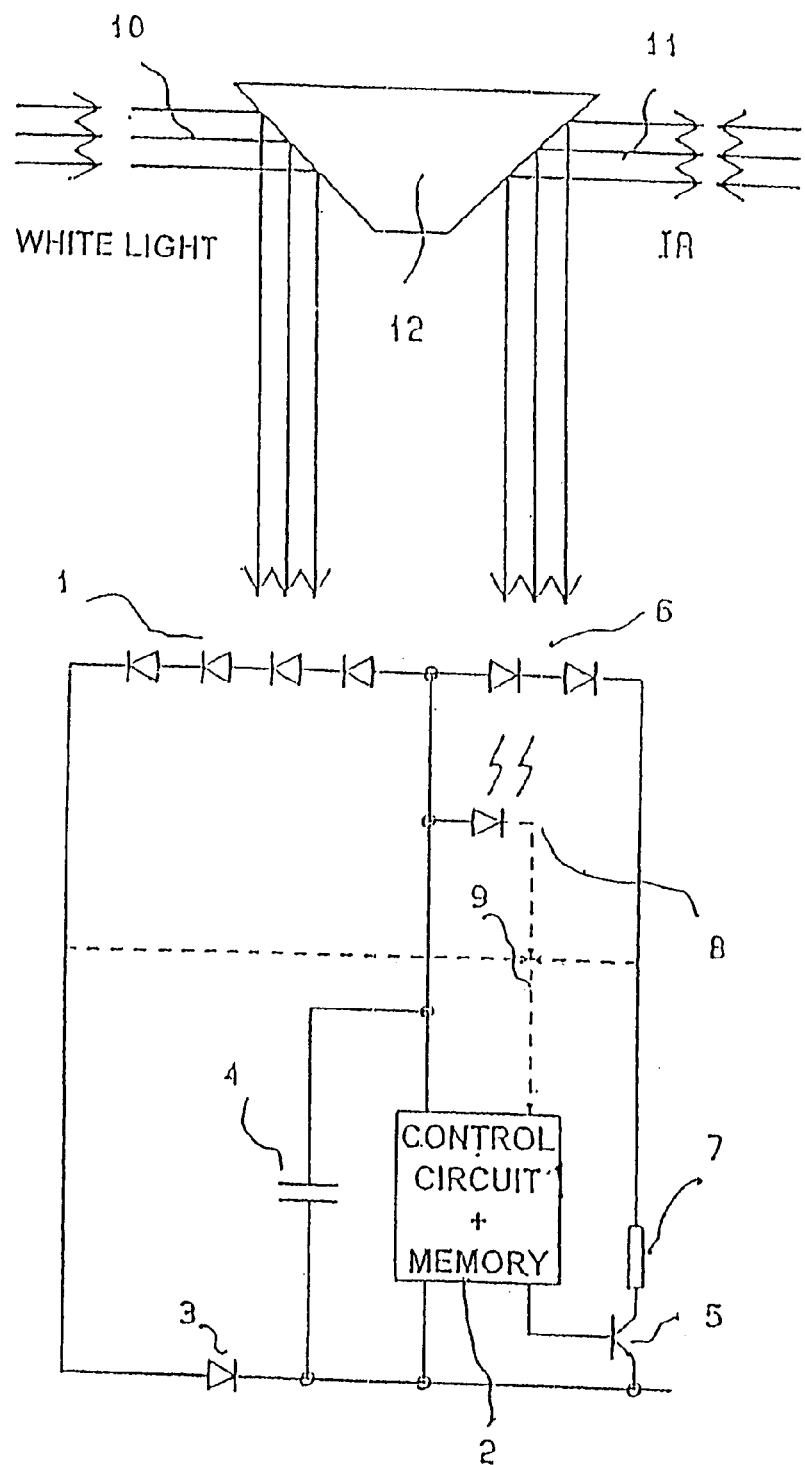
FIG. 1 shows in exemplified form a diagram of a label according to the invention.

FIG. 1 shows four electrooptical cells 1, e.g. photovoltaic cells on amorphous silicon or GaAs cells on crystalline silicon. The choice of cell type obviously depends on the envisaged application. For example, labels are known intended for industrial applications or access controls having a credit card format, where the surface available for the electrooptical cells is relatively large, which makes it possible to use large surface, but low price cells, as in cheap electronic calculators. There are also applications where a maximum miniaturization is sought, which requires high efficiency cells, but having a very small surface area. When a light beam is directed onto said cells, they deliver a voltage making it possible to supply the memory with its control circuit 2 across a diode 3 and a buffer capacitor 4. This capacitor 4 plays an important part, because it makes it possible to supply current peaks, which the cells could not supply and offers an energy reserve so that, if appropriate, it is possible to terminate an operation taking place if the light energy source disappears. Preferably, the control circuit 2 will have a circuit making it possible to limit the supply voltage in the case of an excessively violent illumination of the cells. The control circuit 2 is connected to the base of a transistor 5, which e.g. supplies two light-emitting diodes 6 across a resistor 7. It is therefore possible by means of said LED's, to deliver to the exterior light signals in harmony with the content of the memory and said signals can be detected by known means. For example, if the diodes are of the IR type, it is possible to use an IR detector like those used for personnel detection. It is also possible to deliver light signals by incident light variation, i.e. by varying that part of the light beam which is reflected by the label.

In the simplest configuration where the memory is of the read only type, it could be imagined that the control circuit 2 is automatically cut in when the supply voltage reaches an adequate value, permanently scans the entire memory and supplies corresponding signals by means of the transistor 5 to the diodes 6. It would therefore be possible to permanently read the memory content, when the cells 1 are sufficiently illuminated.

However, this configuration does not offer significant advantages compared with a simple bar code. A higher performance solution consists of using a read-write memory of the EEPROM type, which maintains its informations in the absence of a power supply.

It is then necessary to be able to deliver informations to be stored in the memory and control the different read and write sequences from the exterior. For this purpose, it is e.g. possible to modulate the light beam directed onto the label. These modulations can be detected by an optical detector, e.g. a photodiode 8 connected by an input 9 of the control circuit 2 to a circuit for the amplification and shaping of the latter.

Another simpler solution consists of directly using all or part of the electrooptical cells 1 for detecting these modulations. Thus, said cells can have a sufficiently short reaction time to introduce control signals by short interruptions of the light beam (on/off modulation) at a frequency of several kHz. These short interruptions are filtered by the diode 3 and the capacitor 4 in such a way that they have a negligible influence on the supply voltage. The control signal generated by the cells 1 are then applied to the input 9 of the control circuit of the memory 2.

Another possibility consists of using light-emitting diodes 6 as photodetectors. It is known that these elements, in certain configurations, can be reversible and can therefore be used as transmitters and receivers.

It is pointed out that it is possible to completely separate the energy supply part represented by the cells 1 and the information transmitter-receiver part represented by the photodiode 8, which in certain cases can be eliminated, and the diodes 6. This separation can also take place with respect to the wavelength of the light beams. For the energy supply part, use is e.g. made of a white light similar to sunlight. For the transceiver part, it is preferable to work in the infrared, which gives a much more selective light and which is consequently less sensitive to external disturbances. In the case where the diodes 6 are reversible and also used as photodetectors, the latter are connected to the input 9 of the control circuit 2. The three connection possibilities for the input 9 are shown in dotted line form in FIG. 1.

In the fist example given, the energy supply will consequently take place permanently by concentrating on the label a white light beam 10 and communicating informations by a bidirectional infrared beam 11. The prism 12 makes it possible to combine these two beams in such a way as to diagrammatically represent the operation of the system, but it is obvious that these two beams can come from two completely separate sources, which are completely separated in space. There are numerous possibilities for generating light beams and for supplying them to the surface of the label, either directly, or indirectly, e.g. via a combination of optical elements, filters, lenses, optical fibres, etc.

Figure 2:
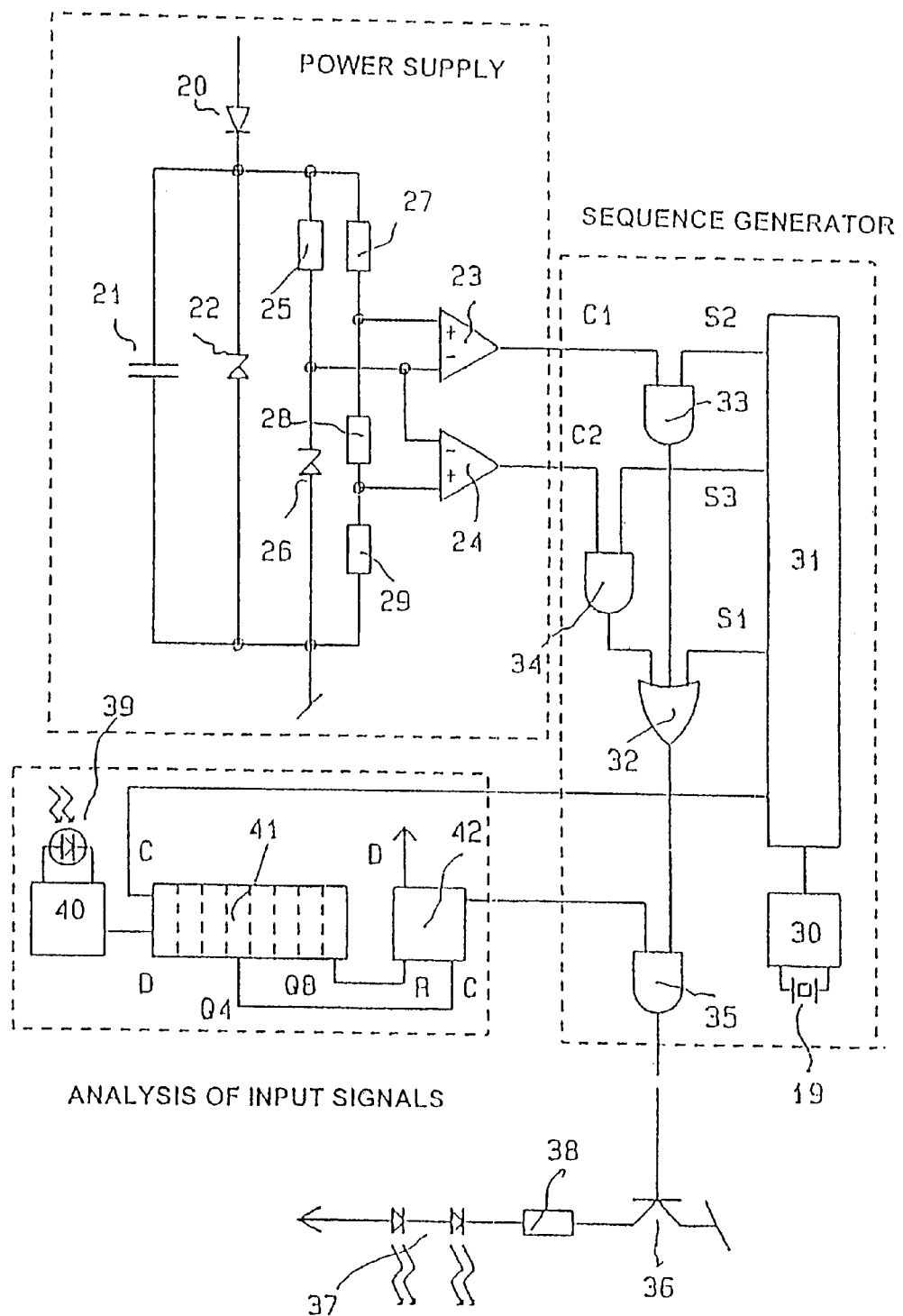
FIG. 2 shows in exemplified manner the block diagram of part of the subassemblies constituting the label according to the invention, more specifically the time base with sequence generator, the supply with its control circuit and a simple circuit for analyzing light signals coming from the exterior.

FIG. 2 shows in exemplified manner the block diagram of part of the subassemblies or subsystems constituting the label according to the invention and more specifically the time base with sequence generator, the power supply with its control circuit, and a simple circuit for analyzing light signals coming from the exterior.

The label supply is provided by photovoltaic cells across the diode 20. The buffer capacitor 21 makes it possible to accumulate a certain energy reserve able to ensure the operation of the label during a given time period, even in extreme cases, whilst the Zener diode 22 brings about an upward limitation of the supply voltage.

The supply voltage is connected to the negative inputs of two comparators 23 and 24 across the resistor 25 and the Zener diode 26, which fix a voltage reference Vz. The voltage divider formed by the resistors 27, 28 and 29 fix the voltages on the positive inputs of said two comparators 23 and 24. This is a conventional voltage comparison configuration. The output C1 of the comparator 23 passes to 1 when the supply voltage exceeds the value $V1=Vz*(R27+R28+R29)/(R28+R29)$, and the output C2 of the comparator 24 will pass to 1 when the supply voltage exceeds $V2=Vz*(R27+R28+R29)/(R29)$, as shown in the following drawing. Thus, these two comparators make it possible to control the supply voltage and more particularly the charging level of the capacitor 21.

It is known that, in the programming of nonvolatile memories, it is necessary to have an adequate energy to ensure the quality of the writing and guarantee the duration thereof. It is therefore preferably to obviate said writing operation if the availability of the energy is not ensured, hence the importance of this control of the supply. Obviously it is possible to use any random configuration of a circuit able to control said voltage levels. It is also possible to only detect a single level, or supplementary levels, as a function of needs.

The diagram of FIG. 2 also has an internal time base 30, which can be a RC oscillator. This oscillator controls a sequence generator 31 formed by a combination of logic circuits and counters arranged so as to generate the different sequences of electrooptical signals, which will be supplied to the outside. In the present example, said generator delivers three sequences S1, S2 and S3 described in greater detail hereinafter. Sequence S1 is connected to the input of an OR gate 32, whose two other inputs are connected to the outputs of two AND gates 33 and 34. The inputs of the AND gates 33 are connected to the output S2 of the generator and to the output C1 of the comparator 23, whilst the inputs of the AND gate 34 are connected to the generator output S3 and to the output C2 of the comparator 24.

When the supply voltage is lower than V1, the outputs C1 and C2 are at 0 and the gates 33 and 34 are closed. Only the sequence of signals S1 arrives at the output of the gate 32.

When the supply voltage passes between V1 and V2, the output C1 passes to 1, which unlocks the gate 33. The sequence S2 then passes to the second input of the gate 32. The sequence of signals at the output of said gate is equal to S1+S2.

When the supply voltage exceeds V2, the output C2 also passes to 1, which unlocks the gate 34. The sequence S3 then passes to the third input of gate 32. The sequence of signals at the output of gate 32 is then equal to S1+S2+S3.

The signals at the output of gate 32 are applied to an input of the AND gate 35. If the latter is in the on state, these signals appear at the output of said gate, which is connected to the base of a transistor 36 connected to the light emitting diodes 37 across the resistor 38. The light signals emitted by these diodes are consequently the image of sequences of signals at the output of gate 32, which are directly dependent on the output states of the comparators 23 and 24 and which are consequently inter alia representative of the charging state of the capacitor 21. Configuration examples of these signal sequences are described hereinafter. These configurations can be decoded by optical reading means and it is consequently possible to e.g. know if the light beam directed onto the label has an adequate energy to supply the label and ensure writing or entry in the memory with adequate security. It should be noted that the frequency precision of the sequences of the light signals delivered to the outside is directly dependent on the precision of the time base 30. The lower the latter, the more complex and delicate the external means for decoding the signal sequences, requiring frequency synthesizers and sophisticated processing means. Conversely, the more precise the frequency of these signals, the easier it will be to decode them, even with a high noise level, which is particularly important when it is wished to operate at a significant distance. A simple means for obtaining this precision is to use a quartz resonator 19, as the time base reference. It is known that there are at present very small quartz resonators, which can be integrated even into small labels.

We have seen how the generator can generate sequences of optical signals emitted to the exterior. It is also possible to use it for analyzing signals coming from the outside. In this simple example, the signals detected by the photodiode 39 are amplified by the amplifier 40 delivering at its output an on/off signal on the input d of an 8 stage shift register 41, which receives on its clock input a control signal coming from the generator 31. The output of the fourth stage of the register is connected to the clock input of a flip-flop 42, whose input D is connected to the power supply, whilst the output of the eighth stage of the register is connected to the reset input of said flip-flop 42. The output of the flip-flop 42 is connected to the second input of the AND gate 35. When said output is at 1, the gate permits the passage of sequences of signals generated by the generator 31. If said output is at 0, said signals are cut out. It is therefore a switch making it possible to control from the outside the putting into service of the label. Thus, in the case where there are several labels close to one another, interference could occur between them if they are automatically activated when a voltage appears on the photovoltaic cells. Therefore a rudimentary switch like that of FIG. 2 can be useful.

As will be shown hereinafter, the light signals coming from the outside are very short signals. Thus, the output of the amplifier 40 is virtually permanently at 0 and the shift register is at 0. If a longer signal is delivered, the output of the amplifier 40 remains at 1 and said 1 state progresses into the register with the timing given by the relatively low frequency control signals on the clock input. At the end of 4 clock pulses, the output Q4 passes to 1, so that the output of the flip-flop 42 is switched to 1 and opens the gate 35. If the signal at the output of amplifier 40 passes to 0 at this time, said flip-flop 42 remains at 1 and the label delivers its light signals to the outside. For switching the flip-flop 42 to 0 and breaking the emission of the light signals, it is necessary to send a longer signal until the output S8 passes to 1. At this time the flip-flop 42 is reset to 0 and the gate 35 is cut out. It is therefore possible to use the time base and sequence generator for discriminating in a simple manner between the activation and deactivation instructions coming from the outside. It should be noted that it is also possible to discriminate longer or shorter interruptions of the light signal by reversing the output phase of the amplifier 40. This could in particular be the case on using interruptions of the white light supplying the photovoltaic cells for giving said activation and deactivation instructions. The input of the amplifier 40 would then be directly connected to said cells and not to the photodiode 39. Examples of the analysis of input signals of a more sophisticated nature will be given hereinafter.

Figure 3:
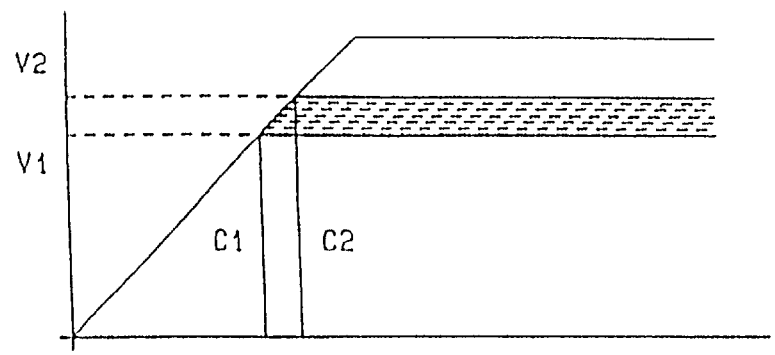
FIG. 3 shows certain characteristic voltages of the supply circuit and its control means.

FIG. 3 shows certain characteristic voltages of the supply circuit and its control means. It shows the switching of the outputs C1 and C2 as a function of the supply voltage and detection levels V1 and V2.

Figure 4:
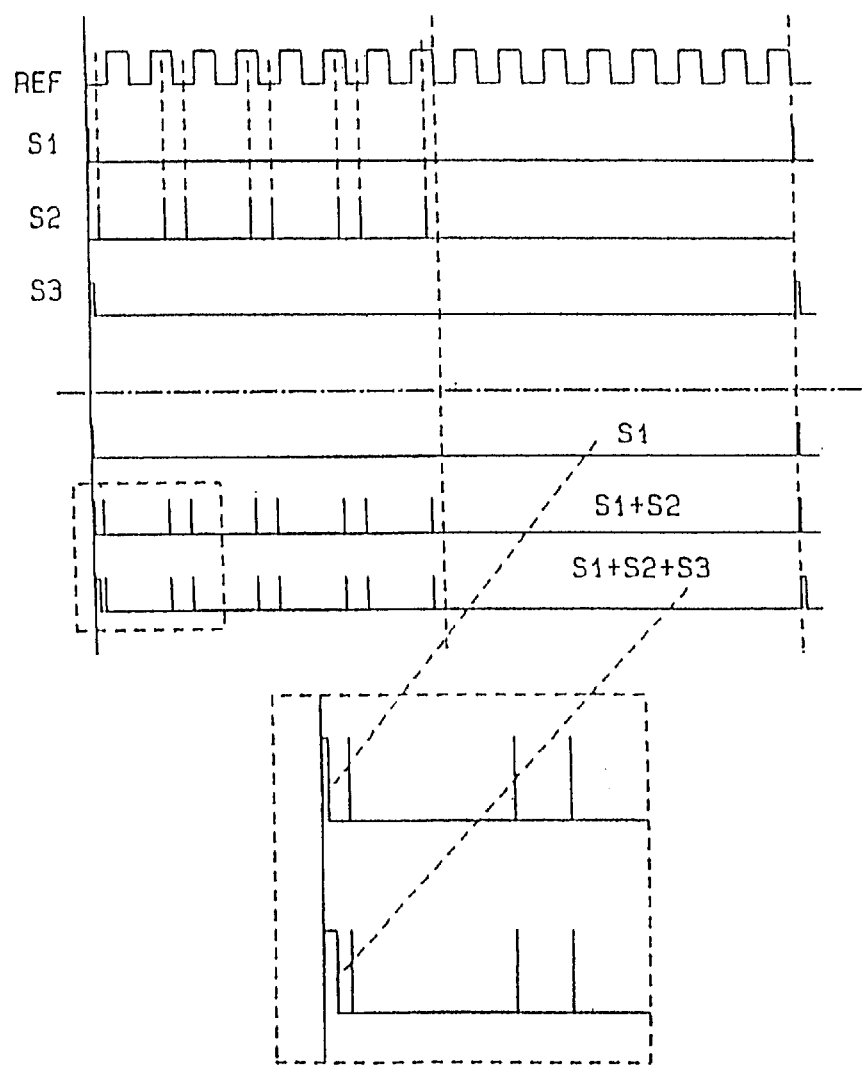
FIG. 4 shows a few examples of sequences of light signals delivered by the sequence generator.
Figure 5:
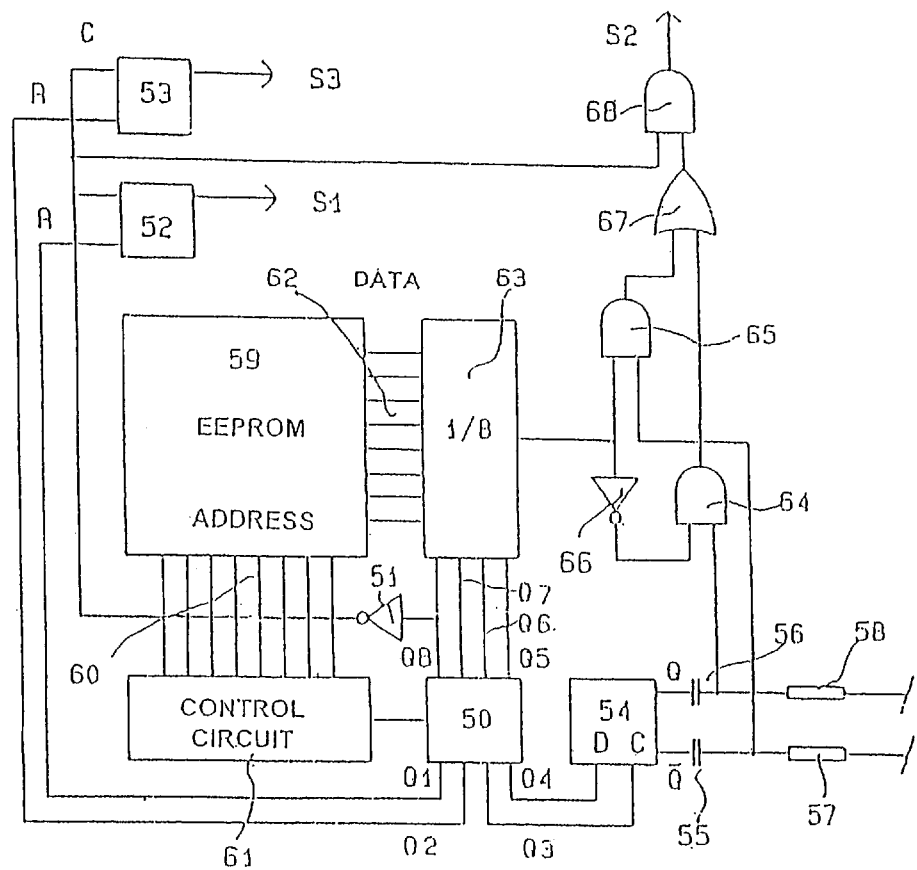
FIG. 5 shows in exemplified manner a more detailed diagram of a sequence generator and the memory control circuit.

FIG. 4 shows examples of light signal sequences delivered by the sequence generator. The sequence generator generates a first sequence S1 in the form of average duration, fixed period pulses, e.g. 4 microseconds for a 1,000 microsecond period. The sequence S2 is represented by a sequence of 8 short pulses, e.g. 2 microseconds, repeated in accordance with the same period as the sequence S1. This sequence of short pulses represents an 8 bit logic information, in which it would be possible to distinguish the 1's from the 0's by the duration of the pulses. However, in the case given in exemplified manner, this distinction takes place by varying the phase of said pulses within the period. Thus, on comparing the position of these pulses with a reference signal, it can be considered that the pulse dropping in the first period from S1 corresponds to bit 1, the pulse dropping in the second period to bit 2, etc. The bit value is 0 if the corresponding pulse drops in the half-period where the reference signal is at 0. It is at 1 if it drops in the half-period where the signal is at 1. These 8 bit informations can correspond to the content of a position of the memory or the address given by the control circuit thereof. FIG. 5 gives an example of a circuit making it possible to generate these signals.

FIG. 4 gives three combination possibilities for the light signals emitted by the label as a function of the charging state of the buffer capacitor. When the latter is too low, elimination takes place of the signals corresponding to the logic informations and only a minimum signal S1 is maintained, which indicates to the outside that the label is supplied, although not in an adequate manner to ensure its satisfactory operation. When the supply voltage is between V1 and V2, addition takes place of pulses corresponding to logic informations. It is thus possible e.g. to read the label, but not write therein. For this purpose it is necessary for the supply voltage to exceed V2. At this instant addition takes place of the signal S3, which makes it possible to distinguish this condition by a double duration of the first pulse of the period of the sequence.

Even when reference is made to long or medium duration pulses, these are always relative durations permitting an easy distinction between the pulses. However, these pulse durations are always small compared with the actual sequence period, in order to reduce consumption. Thus, if permanent injection took place of a current of 10 mA into the LED's, a very large photovoltaic cell surface would be needed. With 8 pulses of 2 microseconds and 1 pulse of 8 microseconds per 1,000 microsecond period, said consumption is divided in the ratio 24:1,000, i.e. approximately 0.24 mA. This procedure would not be possible without using the buffer capacitor, which is able to instantaneously supply these current peaks.

Figure 6:
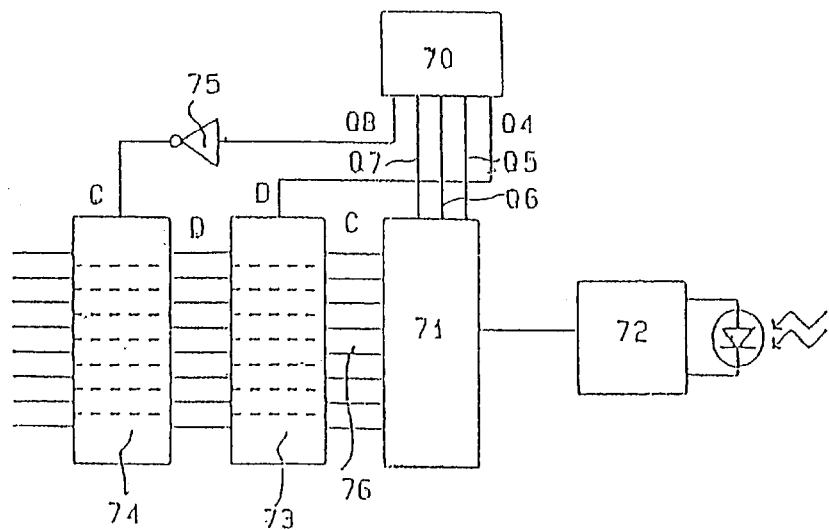
FIG. 6 shows in exemplified manner a more sophisticated circuit for analyzing light signals coming from the exterior and coupled to the sequence generator.

It is pointed out that all the signals emitted to the outside are grouped in the first half-period of the sequence. Thus, it is possible to reserve the second half-period of said sequence for the reception of signals coming from the outside. These signals can be phase-distributed, short pulses, like the signals emitted during the first half-period and as is shown in FIG. 6. Thus, there is a uniform system both on transmission and reception of the signals.

FIG. 5 shows a more detailed diagram of a sequence generator and the control circuit of the memory according to the invention. This generator incorporates a binary counter 50 having in the present example 8 stages and outputs Q1 to Q8. The output Q8 has a period of 1,000 microseconds, so that Q1 has a period of 8 microseconds, Q1 16 microseconds, Q3 32 microseconds, etc. Output Q8 is connected by the inverter 51 to the clock inputs of two flip-flops 52 and 53. The reset input of the flip-flop 52 is connected to the output Q1 of the counter 50. This flip-flop switches to 1 at each period start of Q8, i.e. every 1,000 microseconds and then returns to 0 half period of Q1 later, i.e. after 4 microseconds. Thus, flip-flop 52 generates pulses S1, shown in FIG. 4. The reset input of flip-flop 53 is connected to the output Q2 of counter 50. This flip-flop switches to 1 for each period start of Q8, i.e. every 1,000 microseconds and then returns to 0 half period of Q2 later, i.e. after 8 microseconds. Thus, flip-flop 53 generates the pulses S3 shown in FIG. 4. Output Q3 is connected to the clock input of a flip-flop 54, whose input D is connected to Q4. Thus, said flip-flop will have the same period as Q4, i.e. 64 microseconds, but will be displaced by a half period from Q3, i.e. 16 microseconds. The outputs Q and Qinv of the flip-flop 54 are derived by capacitors 55 and 56 and resistors 57 and 58 so as to form short pulses of approximately 1 to 2 microseconds, mutually displaced by half period of Q4, which will be used for generating the sequence S2.

The label according to the invention also has an EEPROM 59, whose address inputs 60 are connected to a control circuit of the memory 61, connected to the counter 50 in such a way that the address change is synchronized on the latter. The data output 62 of memory 59 are connected to a ⅛ demultiplexer 63, which has three selection inputs connected to the outputs Q5 to Q7 of counter 50.

Sequence S2 is generated in the following way. The pulses formed by capacitors 55 and 56 are applied to an input of the AND gates 64 and 65. The second input of gate 65 passes to the output of demultiplexer 63. This output also passes to an inverter 66, whose output is connected to the second input of gate 64. Thus, said two gates 64 and 65 operate in alternating manner. When the first is off, the other is on and vice versa. The outputs of these two gates 64 and 65 are connected to an OR gate 67. Thus, if the output of demultiplexer 63 is at 1, it is the pulse formed by capacitor 55 which will pass to the output of gate 6 and if it is at 0, it will be the pulse formed by capacitor 56 which will pass on. Thus, generation takes place of a pulse sequence in the manner represented under S2 in FIG. 4. The time distribution of this pulse sequence is directly related to the data contained in the memory 59, which will sequentially appear at the output of demultiplexer 63 and scanned by means of outputs Q5 to Q7 of counter 50.

It should be noted that it is possible to transmit in the same way to the outside data relating to parameters other than the memory content, e.g. addresses given by the memory control circuit, or any other data relating to label operation.

Finally, the output of gate 67 is connected to the input of an AND gate 68, whose second input is connected to the output of the inverter 51. During the half-period where said output is at 0, the gate 68 is locked and does not allow the passage of signals to the outside. Thus, said half-period can be used for receiving and analyzing signals from the outside. These signals can be shaped in the same way and with the same time distribution as the output signals, which permits the use of a similar circuit for decoding said signals.

FIG. 6 shows in exemplified form a more sophisticated circuit for analyzing light signals coming from the exterior and coupled to the sequence generator. This generator incorporates the counter 70, which is the same as counter 50 of FIG. 5. This counter has outputs Q4 to Q8. Outputs Q5 to Q7 are connected to the selection inputs of a multiplexer 71, whose input is connected to the output of an amplifier 72 of signals coming from the outside. These signals can be in the form of short pulses directed, according to their phase, to the clock input 76 of 8 D latches 73, whose D inputs are connected to the output Q4 of counter 70. Thus, in turn, the 8 D latches will pass to 0 or 1, as a function of whether the pulse on their clock input arrives during the half-period where Q4 is at 0 or 1. This combination makes it possible to reconstitute a parallel 8 bit information, which will be recorded by a second group of D latches 74, whose inputs D are connected to the outputs of the 8 preceding latches and whose clock inputs are connected to the output of an inverter 75, whose input is connected to the output Q8 of the counter 70.

Thus, there is a bytewise information reconstitution as a function of the time distribution of the input signals, the latter being sychronized with the internal sequence generator. Thus, the latter is used both for generating the output signal sequences and for analyzing the input signals.

It is obvious that numerous combinations are possible, but a description thereof would not provide supplementary elements facilitating the understanding of the invention.

What is claimed is:

1. Optoelectronic label having optoelectric cells (1) arranged so as to intercept light (10) for supplying the optoelectronic label, an electronic memory (59) able to maintain its state in the absence of a power supply, a control circuit (61) connected to the electronic memory (59), several electrooptical means (6, 8) arranged so as to detect input light signals (11) and deliver output light signals (37) and a sequence generator (31) with a time base (30), characterized in that it has a shift register (41) registering the length of the input light signals (11), the shift register (41) is connected to a gate (35), said shift register (41) opening said gate (35) to the signal sequence (S1,S1+S2,S1+S2+S3) to be delivered to the outside when the length of the input light signals (11) exceeds an opening length and said shift register (41) closes said gate (35) to the signal sequence (S1,S1+S2, S1+S2+S3) to be delivered to the exterior when the length of the input light signals (11) exceeds a closing length, making it possible to activate or deactivate the optoelectronic label from the outside.

2. Optoelectronic label having electrooptical cells (1) arranged so as to intercept light (10) for supplying the optoelectronic label, an electronic memory (59) able to maintain its state in the absence of a power supply, a control circuit (61) connected to the electronic memory (59), several electrooptical means (6, 8) arranged so as to detect input light signals (11) and deliver output light signals (37) and a sequence generator (31) with a time base (30), characterized in that an optoelectronic label supply is provided by electrooptical cells (1) across a buffer capacitor (21) permitting the delivery of a supply voltage (V) and the accumulation of a certain energy reserve, the sequence generator (31) generates a minimum signal (S1) and is connected to a first gate (32), a medium level signal (S2) being connected to a second gate (33) and a maximum level signal (S3) being connected to a third gate (34), the second gate (33) and third gate (34) are connected to the first gate (32), the first gate (32) opens when the supply voltage (V) is below a first voltage (V1) enabling the minimum signal (S1) to pass said first gate (32) indicating that the optoelectronic label is supplied, but inadequately for an operation requiring a medium or maximum level energy, the second gate (33) opens when the supply voltage (V) exceeds the first voltage (V1) and is below a second voltage (V2) permitting a signal sequence (S1+S2) to pass said first gate (32) indicating that the optoelectronic label is adequately supplied for an operation requiring a medium level energy, the third gate (34) opens when the supply voltage (V) exceeds the second voltage (V2) enabling a signal sequence (S1+S2+S3) to pass said first gate (32) indicating that the optoelectronic label is adequately supplied for an operation requiring a maximum level energy, the signal sequences (S1, S1+S2, S1+S2+S3) making it possible to supply output light signals (37) indicating to the exterior the charging state of the buffer capacitor (21) as a function of the presence of signal sequences (S1,S1+S2,S1+S2+S3).

3. Optoelectronic label according to claim 2, characterized in that the second and third gates (33, 34) are AND gates, the first gate (32) is an OR gate and the signal sequences (S1,S1+S2,S1+S2+S3) are connected to a light-emitting diode (6) making it possible to deliver output light signals.

4. Optoelectronic label according to claim 2, characterized in that the supply voltage (V) supplied by the buffer capacitor (21) is connected to the inputs of two comparators (23, 24), an output (C1) of the first comparator (23) is connected to the input of the second gate (33) and an output (C2) of the second comparator (24) is connected to the input of the third gate (34), the outputs (C1, C2) are equal to 0 closing the second and third gates (33, 34) when the supply voltage (V) is below the first voltage (V1), the output (C1) is equal to 1 opening the second gate (33) and the output (C2) equal to 0 when the supply voltage (V) exceeds the first voltage (V1) and is lower than the second voltage (V2) and the outputs (C1, C2) are equal to 1 opening the second and third gates (33, 34) when the supply voltage (V) exceeds the second voltage (V2).

5. Optoelectronic label according to one of the claims 2 to 1, characterized in that the control circuit (61) and electronic memory (59) are connected to a demultiplexer (63), the medium level signal (S2) is a pulse train, the data relative to the optoelectronic label are sequentially scanned at the output of the demultiplexer (63) by the medium level signal (S2), permitting a time distribution of the pulse train of said medium level signal (S2) and the delivery of output light signals (37) indicating to the exterior the data relative to the optoelectronic label as a function of the time distribution of the pulse train of said medium level signal (S2).

6. Optoelectronic label according to claim 2, characterized in that the input light signals (11) are detected by a photodiode (8), an output of the photodiode (8) is connected to an amplifier (72) shaping pulses, said pulses being directed, as a function of their phase, to the inputs of latches (73) making it possible to reconstitute a parallel information from input light signals (11) permitting the control of the control circuit (61) and the writing in the electronic memory (59).

7. Optoelectronic label according to claim 2, characterized in that the signal sequences (S1,S1+S2,S1+S2+S3) making it possible to deliver output light signals (37) indicating to the exterior the data relative to the optoelectronic label are grouped in a first half-period of a signal sequence (S1,S1+S2,S1+S2+S3) and the input light signals (11) from the exterior are grouped in a second half-period of the signal sequence (S1,S1+S2,S1+S2+S3).

8. Method for indicating supply voltage levels (V) of a buffer capacitor (21) supplying an optoelectronic label according to claim 2, characterized in that the different signals (S1,S2,S3) generated by a sequence generator (31) are sequentially added forming signal sequences (S1,S1+S2,S1+S2+S3) indicating the different supply voltage levels (V) and said signal sequences (S1,S1+S2,S1+S2+S3) are delivered in the form of output light signals (37) to the exterior.

9. Method for indicating supply voltage levels (V) of a buffer capacitor (21) supplying an optoelectronic label according to claim 8, characterized in that the signal sequences (S1,S1+S2,S1+S2+S3) indicating the different supply voltage levels (V) of the buffer capacitor (21) are decoded by optical reading means making it possible to know whether the light beam directed onto the optoelectronic label has an adequate energy for supplying the optoelectronic label and for ensuring the operations requiring a medium or maximum level energy.

* * * * *